(12) United States Patent
Ohrt et al.

(10) Patent No.: US 12,235,432 B2
(45) Date of Patent: Feb. 25, 2025

(54) METHOD FOR MONITORING AN IMMERSION FLUID IN A MICROSCOPE

(71) Applicant: Carl Zeiss Microscopy GmbH, Jena (DE)

(72) Inventors: Thomas Ohrt, Golmsdorf (DE); Daniel Haase, Zöllnitz (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 553 days.

(21) Appl. No.: 17/393,104

(22) Filed: Aug. 3, 2021

(65) Prior Publication Data
US 2022/0091406 A1  Mar. 24, 2022

(30) Foreign Application Priority Data
Sep. 18, 2020  (DE) .......................... 102020211702.0

(51) Int. Cl.
*G02B 21/33*  (2006.01)
*G01N 21/64*  (2006.01)
(Continued)

(52) U.S. Cl.
CPC ........... *G02B 21/33* (2013.01); *G02B 21/365* (2013.01); *G06T 5/20* (2013.01); *G06T 7/0002* (2013.01);
(Continued)

(58) Field of Classification Search
CPC .... G02B 21/33; G02B 21/365; G02B 21/367; G06T 5/20; G06T 7/0002; G06T 7/13;
(Continued)

(56) References Cited

U.S. PATENT DOCUMENTS

| | | | |
|---|---|---|---|
| 2016/0170196 A1* | 6/2016 | Rossmann | H04N 23/00 348/79 |
| 2016/0282598 A1* | 9/2016 | Besley | G02B 21/367 |

(Continued)

FOREIGN PATENT DOCUMENTS

| | | |
|---|---|---|
| DE | 10123027 | 11/2002 |
| DE | 102018126527 | 4/2020 |

OTHER PUBLICATIONS

German Search Report for 10 2020 211 702.0, mailed May 31, 2021.

*Primary Examiner* — Chan S Park
*Assistant Examiner* — Daniel C Chang
(74) *Attorney, Agent, or Firm* — NIXON PEABODY LLP; Jeffrey L. Costellia

(57) ABSTRACT

Provision is made for a method of monitoring an immersion fluid in a microscope having a lens which images a sample located on a sample carrier. In a step a), a camera is positioned which has an image field which is oriented in such a way that it captures the sample carrier and a space between the sample carrier and the lens and adjoining the sample carrier towards the lens, which space is used to receive the immersion fluid. In a step b), the immersion fluid is applied into the space between the sample carrier and the lens. In step c), an image with the immersion fluid being in the space between the sample carrier and the lens is recorded, and in a step d), the position, the area and/or the contour of the immersion fluid on the sample carrier from the image recorded in step d) are/is determined.

27 Claims, 5 Drawing Sheets

(51) Int. Cl.
*G02B 21/36* (2006.01)
*G06T 5/20* (2006.01)
*G06T 7/00* (2017.01)
*G06T 7/13* (2017.01)
*G06T 7/62* (2017.01)
*G06T 7/73* (2017.01)
*G06T 7/80* (2017.01)
*H04N 23/56* (2023.01)

(52) U.S. Cl.
CPC ................ *G06T 7/13* (2017.01); *G06T 7/62* (2017.01); *G06T 7/73* (2017.01); *G06T 7/80* (2017.01); *H04N 23/56* (2023.01); *G01N 21/6458* (2013.01); *G01N 2021/6463* (2013.01); *G06T 2207/10048* (2013.01); *G06T 2207/10056* (2013.01); *G06T 2207/10152* (2013.01)

(58) Field of Classification Search
CPC .... G06T 7/62; G06T 7/73; G06T 7/80; G06T 2207/10048; G06T 2207/10056; G06T 2207/10152; G06T 7/12; H04N 23/56; G01N 21/6458; G01N 2021/6463; G01N 2021/945; G01N 21/94
See application file for complete search history.

(56) References Cited

U.S. PATENT DOCUMENTS

| | | | |
|---|---|---|---|
| 2019/0056295 A1* | 2/2019 | Cheng | G01N 1/2813 |
| 2019/0250094 A1* | 8/2019 | Pandey | G01N 21/21 |
| 2020/0341259 A1* | 10/2020 | Chan | G02B 21/33 |
| 2021/0239960 A1* | 8/2021 | Rideout | G02B 21/0088 |
| 2022/0003979 A1* | 1/2022 | Spiecker | G02B 21/0076 |

* cited by examiner

METHOD FOR MONITORING AN IMMERSION FLUID IN A MICROSCOPE

BACKGROUND OF THE INVENTION

Field of the Invention

The invention relates to a method for monitoring an immersion fluid in a microscope having a microscope lens which images a sample located on a sample carrier. To this end, an image of the immersion fluid is recorded in a space between the sample carrier and the microscope lens. The invention further relates to a device for monitoring an immersion fluid in a microscope having a microscope lens which images a sample located on a sample carrier. To this end, a camera records an image of the immersion fluid in a space between the sample carrier and the microscope lens.

Description of Related Art

A device for the automated introduction of immersion medium into a space between the microscope lens and the sample is known from U.S. Pat. No. 6,980,293 B1. An enlarged image of the microscope lens and the sample is recorded, and immersion fluid is introduced in an automated manner into the space between the lens and the sample using a supply unit.

US 2007/0 047 093 A1 describes a device for the automated application of immersion fluid and for the automated cleaning of the microscope lens.

Based on this, a method for the automated monitoring of the immersion fluid in a microscope is to be provided.

BRIEF SUMMARY OF THE INVENTION

The invention is defined in independent claims 1 and 15. Advantageous further developments are set forth in the dependent claims. The preferred embodiments apply in the same way to the method and the device.

Provision is made for a method of monitoring an immersion fluid in a microscope having a microscope lens which images a sample located on a sample carrier. In a step a), a camera is oriented which camera has an image field. The orientation is carried out in such a way that the camera with its image field captures the sample carrier and a space between the sample carrier and the microscope lens and adjoining the sample carrier towards the lens, which space is used to receive the immersion fluid.

Furthermore, provision is made for a device for monitoring an immersion fluid in a microscope having a microscope lens which images a sample located on a sample carrier. The device has a camera which has an image field. The camera is positioned in such a way that the image field captures the sample carrier and a space between the sample carrier and the microscope lens and adjoining the sample carrier towards the microscope lens, which space is used to receive the immersion fluid.

The specific positioning of the camera is irrelevant as long as the sample carrier and the immersion fluid or the space in which said immersion fluid is to be located are contained in the image field and in particular are clearly visible. The camera can be attached, for example, to a transmitted light arm of the microscope or to the microscope stand; other positions of the camera are also possible.

In a step b) of the method, the immersion fluid is applied into the space between the sample carrier and the microscope lens. In the case of the device, the immersion fluid is applied using an application means.

In a step c) of the method, an image is recorded with the immersion fluid being in the space between the sample carrier and the microscope lens. In the device, the described recording takes place with the camera.

In a step d) of the method, the position, area and/or the contour of the immersion fluid on the sample carrier are/is then determined from the image recorded in step c).

Since the camera can, in principle, be placed anywhere, as long as the sample carrier and the immersion fluid or the space provided for said immersion fluid are clearly visible in the image field, the sample plane is usually perspective distorted in the image recorded by the camera. Said image, however, plays a major role in finding and analyzing the immersion fluid, it is therefore advantageous, after a step a) of the method, to calibrate the camera, for example by positioning a previously known calibration pattern in a plane of the sample carrier and in the image field of the camera and recording a calibration image. Reference objects in the form of components of the microscope, such as insert frames, or the sample carrier itself can also be used for calibration.

Another possibility for calibration is to locate the point of intersection of an optical axis of the camera lens with the plane of the sample carrier in the image. In the event that the camera is oriented centrally from above or below towards the sample carrier, this point of intersection is at the center of the camera lens. The position of the camera lens in the image is normally known from the camera structure, but it can alternatively also be determined manually or automatically using a detection algorithm.

In particular, the distortion resulting from the positioning of the camera can be determined and reversed by a transformation and, particularly preferably, the sample plane in the transformed image can be displayed as if the camera had recorded the sample plane exactly from above. For this purpose, the image distortion in the space between the sample carrier and the microscope lens, which is a function of the position of the camera, is determined on the basis of the imaged calibration pattern or a recorded (known) reference object.

To determine the necessary transformation, the known calibration pattern is placed once in the plane of the sample carrier and recorded with the camera. The calibration pattern is designed in such a way that it allows a perspective-related distortion to be recognized in the calibration image. For example, the calibration pattern is designed as a grid or checkerboard pattern. Alternatively, a reference object is recorded with the camera, as already explained above, and used to determine the necessary transformation.

The necessary transformation, the so-called homography, can then be determined from the difference between the calibration pattern or the reference object and its reproduction in the calibration image, wherein an estimate may be sufficient. Homography is imaging that maps the camera plane onto the sample carrier plane. It makes it possible to rectify images with the same camera structure. In addition, with the aid of the calibration pattern or the reference object as well as the calibration image, distortions that arise from the camera optics (e.g., barrel-shaped curvature) can be subtracted from the image. This is also optionally included in the transformation. The calibration thus enables the image recorded by the camera to be rectified geometrically and perspectively by the transformation in such a way that all objects in the plane of the sample carrier, and thus also the immersion fluid on the sample carrier can be represented largely (within the framework of the transformation accuracy contingent upon computation and resolution) without distortion.

The device for monitoring the immersion fluid has a processing means. This processing means can be provided with a calibration image which represents the space between the sample carrier and microscope lens, for example with a previously known calibration pattern in a plane of the sample carrier and in the image field of the camera. The processing means can further be configured in such a way that it, based on the calibration image and thus the imaged calibration pattern, determines an image distortion in the space between the sample carrier and microscope lens. Similarly, a known reference object can be used as the basis for the calibration.

After step a) of the method, alternatively or additionally, a background image can also be recorded in the space between the sample carrier and the microscope lens. This is preferably done after a calibration that may have to be carried out. In the case of the device, the background image is recorded with the aid of the camera. The background image is an image that describes the appearance of the microscope lens in the image without any disruptive influences. The background image can, for example, be recorded without immersion fluid in the space between the sample carrier and the microscope lens.

Furthermore, the background image can be generated by recording a set of typical images with typical environmental variations, such as, for example, different illumination. For a background image, which was recorded with an immersion fluid, the appearance of the microscope lens without immersion fluid can be estimated from the background image value itself.

Preferably, in a step d), the position, the area and/or the contour of the immersion fluid on the sample carrier is determined by searching for a structure in the image which is located within a certain distance from a center of the lens, cannot be assigned to the microscope lens and/or has an approximately annular shape.

In the device, the processing means is configured in such a way that it determines the position, the area and/or the contour of the immersion fluid on the sample carrier, using an image recorded by the camera of the space between the sample carrier and microscope lens with immersion fluid in said space. Optionally, it can use also a background image of the space between the sample carrier and microscope lens recorded by the camera, an image of the space between the sample carrier and microscope lens with immersion fluid being in said space recorded by the camera and/or the image distortion determined. The processing means is preferably configured in such a way that it determines the position, the area and/or the contour of the immersion fluid on the sample carrier by searching for a structure in the image which is located within a certain distance from a center of the microscope lens, cannot be assigned to the microscope lens and/or has an approximately annular shape.

The position of the microscope lens and thus the position of the center of the microscope lens can be known by the calibration carried out optionally beforehand, by an automated estimation based on one or more overview images, or a manual input. Preferably, a maximum search distance is defined. Said search distance is a radial distance from the center of the microscope lens. This maximum search distance is either automatically determined by the microscope application based on the selected microscope lens, the size of the sample carrier or the type of immersion fluid, or it is manually set by the user.

The microscope lens may also generate structures in the image that may resemble the structures of the immersion fluid. The structures in the image that can be assigned to the microscope lens, however, must not be used when determining the position, the area and/or the contour of the immersion fluid in the image. In order to make it easier to distinguish between structures in the image, which can be assigned to the microscope lens, and structures of the immersion fluid, a previously generated background image can be utilized, for example. To this end, the image recorded in step c) is combined with the background image in such a way that, if possible, only the structures of the immersion fluid remain in the image. In the simplest case, the background image consists of a single reference image in which no immersion fluid can be seen. The combination is then a subtraction of the background image from the image generated in step c). However, the combination with several background images is also possible, which comprise several environmental variations, such as varying illuminations.

The structure that is searched for in the image preferably has an approximately annular structure. A deformation of the drop of the immersion fluid is allowed; the ideal situation, however, is a circular drop on the sample carrier, which is visible as a circular ring in the image. The approximately annular structure can be localized using various approaches. One possibility of localizing consists of three steps:

In a first step, pixel values of the image are converted into gray values. To this end, dark gray values are assigned to the approximately annular structure of the immersion fluid and light gray values are not. Such a scaling on the basis of gray values can be carried out, for example, by offsetting with the previously recorded background image.

In a second step, the image is converted from a Cartesian to a polar coordinate system. The origin of the coordinates is chosen to be in the center of the microscope lens. The exact position of the center of the microscope lens can be known, for example, from a previous calibration. After transforming the image into polar coordinates, the contour of the immersion fluid determined in the first step around the microscope lens looks like a straight line. Since the immersion fluid does not necessarily exist as an ideal drop due to external influences, such as movement of the sample table, and therefore not as an exactly annular, but almost annular structure, the line in the image transformed into polar coordinates is often also slightly deformed. This can be taken into account in embodiments and compensated for by a distortion transformation.

In a third step, a path is finally determined over all values of the angle axis of the image transformed into polar coordinates. This path minimizes the sum of all pixel values along the path and, after it has been determined, will be transformed back into Cartesian coordinates. The path then corresponds to the contour of the immersion fluid in the image recorded in step c). For the determination of the contour, it is preferably assumed that the drop of the immersion fluid in the image has a closed, continuous shape. When searching for the path, care can be taken to ensure that the change in the radial coordinate for successive elements along the angle axis does not exceed a specified threshold value. This is an optimization problem that is solved by an algorithm for calculating the shortest paths. For example, a Dijkstra algorithm, an A* algorithm or a Floyd-War-shall algorithm may be taken into consideration.

Another possibility of localizing the immersion fluid is based on machine learning. For this purpose, a neuronal network, in particular a deep neural network of so-called deep learning, more preferably at least one convolutional neuronal network (CNN) is set up as a machine learning model and trained to recognize annular or approximately annular structures in a recording showing the immersion fluid applied. The neuronal network or networks can be trained through supervised learning, unsupervised learning, partially supervised learning or reinforcement learning.

In particular, the localization can be carried out with the aid of segmentation, in which the area in which the immersion fluid is located is marked in the recording or the image, with the aid of a classification or semantic segmentation, wherein a distinction is made between areas with and without immersion fluid, and/or with the aid of a detection of areas with and without immersion fluid.

The advantage of using machine learning or a machine learning model lies primarily in its robustness, since it can usually compensate for minor changes or impaired quality in the overview image so that these do not lead to errors. In addition, new elements of the sample carrier environment or a general redesign of the sample carrier environment can easily be added through a new training session. In comparison, the effort that has to be made in classic image analysis in order to compensate for such impaired quality and/or changes is very high, since the changes may influence the detection of known elements and surroundings.

In a preferred embodiment, in a step e) of the method, the contour and/or the area of the immersion fluid on the sample carrier is assessed and/or the volume of the immersion fluid is estimated and/or a remaining duration of the immersion fluid on the sample carrier due to evaporation is determined. In the device, after the contour and/or the area of the immersion fluid has been determined in the image, further steps are carried out in order to assess the shape of the drop of immersion fluid on the sample carrier, to estimate the volume of the drop or to determine the remaining duration due to evaporation.

An ideal drop of immersion fluid completely wets the front lens of the microscope lens and has a circular shape on the sample carrier, which is shown in the image as a toroidal contour. Due to external influences such as the movement of the sample table or if the volume of the immersion fluid is too small/large, it can happen that the front lens is not completely covered and/or the shape deviates significantly from a circle. The quality of the drop of the immersion fluid is therefore preferably assessed in terms of the extent to which the front lens of the microscope lens is covered with immersion fluid. For this purpose, for example, a point of intersection of the optical axis of the microscope lens with the sample carrier plane known from a calibration, that is to say the center of the microscope lens in a plan view of the sample, is used. The size of the front lens is taken from a lens database, for example. In addition, a surface area that is dependent on a numerical aperture and on the distance to the sample carrier around the front lens is defined around the front lens, which surface area must be covered with immersion fluid in order to guarantee optimal image quality. This ensures that the front lens and the surface area surrounding it are always covered with immersion fluid. As a result, appropriate countermeasures, such as, for example, a warning to a user, an automatic immersion, etc., can be initiated in good time, i.e. before the image quality is impaired.

Furthermore, the quality of the drop of immersion fluid is optionally determined in regards to the extent that the drop resembles a circle by assessing suitable features, such as, for example, the eccentricity of an ellipse, which optimally approximates the contour. For example, the eccentricity of the ellipse of the region defined by the contour in the image can be calculated and compared with manually defined or training data from a machine learning model. Alternatively, the contour of the immersion fluid can also be classified from "sufficiently circular" to "too strongly deformed" directly from the image recorded in step c) without using an assessment of the contour of the immersion drop. This can be done, inter alia, on the basis of the area of the immersion drop. In the event of excessive deformation, but also if the volume of the immersion drop or the remaining duration of the immersion drop on the sample carrier is too short, countermeasures such as slower movement of the sample, haptic feedback, a warning to the user, etc., can be carried out depending on the microscopy application.

In addition, a contact area of the immersion fluid on the sample carrier can easily be determined on the basis of the contour and/or the area. In order to also be able to estimate the volume of the immersion fluid, calibration measurements are provided for each microscope lens. To this end, with a known distance between microscope lens and sample carrier, several drops of the immersion fluid with different, known volumes are applied and their contact area with the sample carrier is then automatically determined from the image. This results in a 1:1 mapping between the volume of the immersion drop and its contact area for each microscope lens. The volume of the drop of immersion fluid is estimated from the contact area given a known distance between the sample carrier and the microscope lens. Optionally, it is also estimated how much volume still needs to be applied in order to achieve a required target volume. Furthermore, by determining the volume of the immersion fluid and knowing the geometry of the microscope lens, it is possible to estimate whether the amount of immersion is sufficient for a predetermined recording in order to ensure a desired image quality at every position. Conversely, if the volume of the immersion fluid is known, it is also possible to determine the distance between the sample carrier and microscope lens from the contact area, which can be used, for example, as collision protection.

A light source which is attached to the camera or is present on the microscope is preferably used in the method and in the device for illuminating the image field. The light source(s) is or are preferably controllable with regard to intensity and wavelength range. In this way, several differently illuminated images can be recorded in step c), from the entirety of which the contour, the area and/or the position of the immersion fluid is analyzed. In this way, the assessment of the immersion can be further optimized.

It is also preferred that the camera records the image in the infrared range. In order to keep the dependence on ambient light conditions as low as possible, the camera and the light source preferably operate in the infrared range of the electromagnetic spectrum. This allows the immersion fluid to be monitored in parallel with fluorescence microscopy. If the camera operates in the visible range of the spectrum, or if the spectral ranges of the camera illumination and microscope overlap due to the respective microscopy application, the recording of the image is preferably carried out at different times than the recording of the fluorescent image or the interfering areas in the image are masked out.

It can also be advantageous to arrange a polarization filter on the camera in order to record the image using this polarization filter. The device is then designed in such a way that a polarization filter is to be arranged on the camera or is already arranged in order to record an image with it. Using the polarization filter, reflections on metal surfaces, such as those of a lens, or on the immersion drop can be filtered out or used to find the immersion drop, especially if the image recorded with the polarization filter is combined with an image that was recorded without a polarization filter.

If, as explained above, several differently illuminated images are analyzed in their entirety in step c), the images from the infrared range and/or the images recorded using the polarization filter can also be included.

Contaminants in the immersion fluid are preferably detected in step d) of the method and optionally filtered out of the image recorded in step c. In the device, the processing means is configured in such a way that it detects contaminants in the immersion fluid and optionally also filters them out of the image.

The contour, the area and/or the position of the immersion fluid is known from step d). In this way, following step d, it is possible to search for contaminants in the immersion fluid, such as air bubbles or dust, in the image. In this case, areas in the image are of interest which are within the contour and/or the area and have a strong visual deviation from the microscope lens. In this step, too, the background image (or the background model) can be used again to filter out the structures that are part of the microscope lens. The mostly small, circular structures within the drop of immersion fluid can be found using standard algorithms from the field of image processing and/or machine learning, such as, for example by means of detection.

By means of the method and the device for monitoring the immersion fluid, procedures during microscopy, such as cleaning the microscope lens and applying the immersion fluid, are automated and controlled. According to the known prior art, these procedures were managed manually by the user and under constant supervision and care. An optionally automated application of the immersion fluid is carried out and automatically monitored by the method by checking the contour, the area and/or the position. This checks whether a target volume and a target position of the immersion fluid are maintained within predetermined limits. In addition, it is possible to monitor the amount and location of the immersion fluid in an automated manner while a sample table is being moved in order to ensure that the front lens of the microscope lens is continuously wetted with the immersion fluid and to prevent immersion residues from staying behind on the sample carrier due to excessive deformation of the immersion fluid drop.

The invention is explained in more detail below by way of example with reference to the drawing. In the drawing:

DETAILED DESCRIPTION OF THE INVENTION

Figure 1:
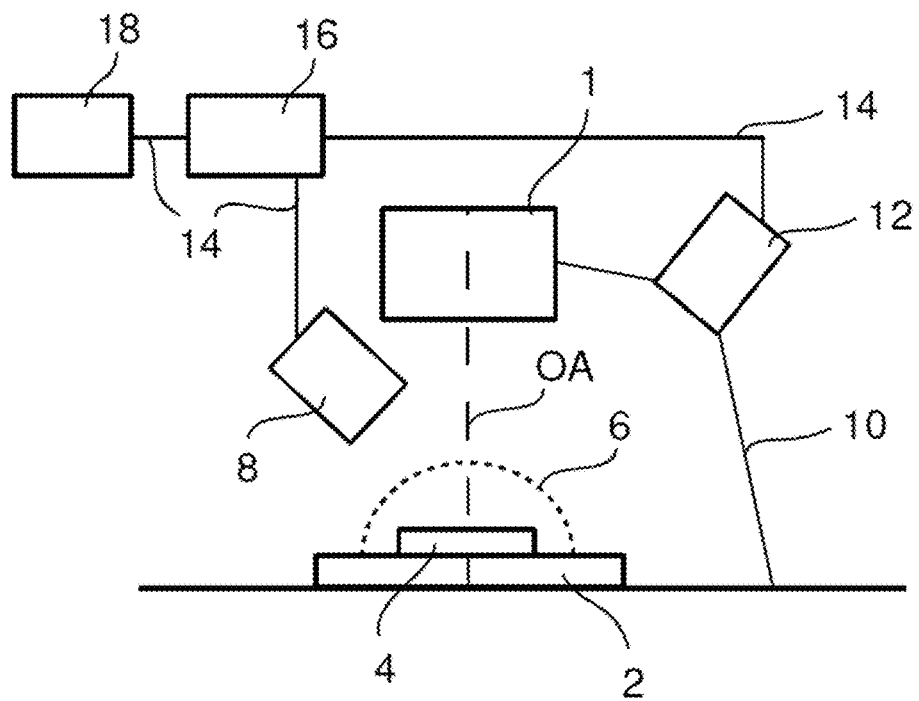
FIG. 1 shows a device for monitoring an immersion fluid in a microscope.

FIG. 1 illustrates a device for monitoring an immersion fluid 6 in a microscope 1. A microscope with a microscope lens (not shown separately) captures a sample 4 located on a sample carrier 2 along an optical axis OA. Immersion fluid 6 is applied to sample carrier 2 and spans sample 4. An application means 8 is provided for applying immersion fluid 6 into a gap between the microscope lens and sample 4. A camera 12 spanning an image field 10 is oriented towards sample 4 and immersion fluid 6. Both application means 8 and camera 12 are connected to processing means 16 via electric lines 14. The processing means is in turn connected to a display device 18 via an electric line 14.

The user is basically free to position camera 12. As a consequence, camera 12 can in principle be placed anywhere as long as sample carrier 2 with sample 4 located thereon and immersion fluid 6 are clearly visible in image field 10. In FIG. 1, the attachment of camera 12 is not shown; camera 12 can be attached, for example, to a transmitted light arm of microscope 1 or to a microscope stand. Due to the possibility of free placement of camera 12, a plane in which the sample is located is generally distorted in perspective in an image that is recorded by camera 12. After the perspectively distorted image has been recorded by camera 12, it is transmitted to processing means 16 via lines 14 or by radio.

In order to be able to find and assess immersion fluid 6, the perspectively distorted image, which was transmitted from camera 12 to processing means 16 via lines 14, must be rectified by a transformation so that the sample plane is represented in a transformed image as if camera 12 had recorded the sample plane exactly from above. For this purpose, the device according to FIG. 1 remains in place, preferably only sample 4 is removed and a calibration pattern with a known structure is introduced into a plane of sample carrier 2. Camera 12 remains in the same position. If the calibration pattern is positioned parallel to the plane of sample carrier 2 (or ideally in its place), a calibration image is recorded by camera 12 and transmitted to processing means 16. Processing means 16 then determines a necessary transformation, a so-called homography H, on the basis of the perspectively distorted image and the calibration image, and identifies therefrom an image distortion in the space between sample carrier 2 and the lens. For this purpose, processing means 16 compares the structure of the calibration pattern with its image according to the calibration image.

If the distortion is known, camera 12 records a further image, a background image 22. In a preferred embodiment, background image 22 represents the space between sample carrier 2 and microscope lens without immersion fluid 6. Background image 22 consequently shows the appearance of the microscope lens in the image without interfering influences. Background image 22 can preferably also be generated by recording a set of typical images 20 with typical environmental variations, such as, for example, different illuminations. In modifications, background image 22 is recorded with immersion fluid 6 introduced into the space between sample carrier 2 and microscope lens. After background image 22 has been recorded by camera 12, it is transmitted to processing means 16 via lines 14. In the case of recording a plurality of images 20 with environmental variations, processing means 16 compiles background image 22 from individual images 20. In the event that background image 22 was recorded with immersion means 6 in the space between sample support 2 and the microscope lens, processing means 16 uses background image 22 itself to estimate how the microscope lens looks without immersion fluid 6.

Application means 8 is used to introduce immersion fluid 6 into the space between sample carrier 2 and the lens. For this purpose, application means 8 is controlled by processing means 16.

If immersion fluid 6 is in the space between sample carrier 2 and the lens, camera 12 records an image with immersion fluid 6 being in the space between sample carrier 2 and lens and transmits it to processing means 16. The position of camera 12 is the same as when background image 22 and the calibration image were recorded.

Processing means 16 corrects the image with regard to the image distortion and then determines the position and contour 34 of immersion fluid 6 on sample carrier 2. To this end, processing means 16 searches in the image for a structure that is located within a certain distance from a center of the microscope lens, cannot be assigned to the microscope lens and has an approximately annular shape.

Processing means 16 is further connected to imaging device 18 via lines 14. Imaging device 18 is, for example, a monitor on which processing means 16 displays the results.

Processing unit 16 preferably assesses contour 34 of immersion fluid 6 on sample carrier 2 and/or estimates the volume of immersion fluid 6 and/or determines a remaining duration of immersion fluid 6 on sample carrier 2 due to evaporation.

In modifications, a light source is provided in the device according to FIG. 1, which light source generates an illumination field which illuminates image field 10. The light source can be attached directly to camera 12, for example; a light source already present on microscope 1 can also be used to illuminate image field 10. When image field 10 is actively illuminated with the light source, camera 12 and the light source preferably operate in the infrared range of the electromagnetic spectrum. This allows immersion fluid 6 to be monitored in parallel with fluorescence microscopy.

In modifications, processing means 16 detects contaminants of immersion fluid 6 and filters them out of the image. To this end, processing means 16 searches for areas in the image which are within contour 34 of immersion fluid 6 and have a strong visual deviation from the image. The contaminants can be, for example, air bubbles or dust. Processing means 16 is able to combine the detected contaminants with background image 22 and thereby remove them from the image. This can be done using standard algorithms from the field of image processing and/or machine learning.

Figure 2:
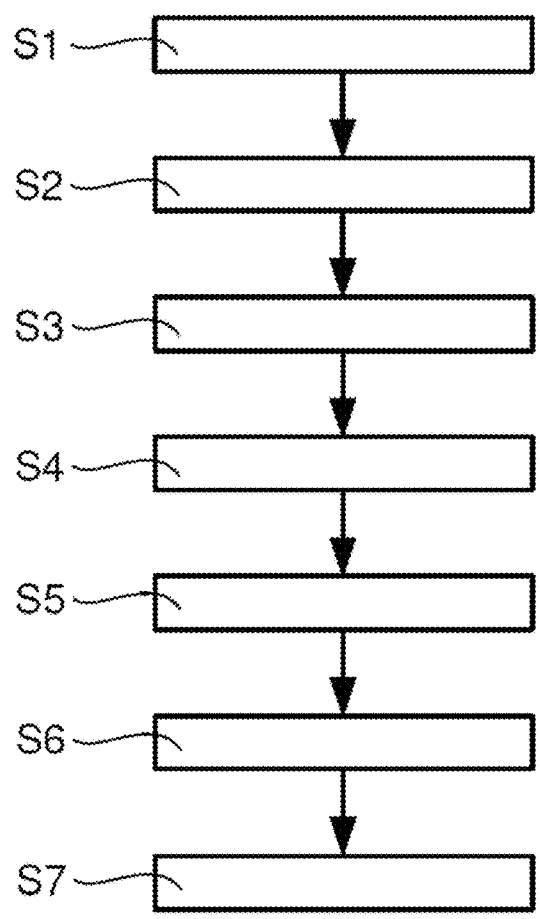
FIG. 2 shows a flow chart of the method for monitoring an immersion fluid in a microscope.

FIG. 2 shows a flow chart for the method for monitoring immersion fluid 6 in a microscope 1 having a microscope lens which images a sample 4 located on a sample carrier 2.

In a step S1, camera 12 is oriented in such a way that image field 10 captures sample carrier 2 and the space between sample carrier 2 and microscope lens adjoining sample carrier 2 towards the microscope lens, which space is used to receive immersion fluid 6.

The camera is calibrated in a step S2. For this purpose, the calibration pattern is positioned parallel to the plane of sample carrier 2, ideally instead of sample carrier 2, and in image field 10, and the calibration image is recorded by camera 12.

Subsequently, in a step S3, the image distortion in the space between sample carrier 2 and microscope lens, which is a function of the position of camera 12, is determined. Homography H, which maps the plane of camera 12 onto the plane of sample carrier 2, is also determined or estimated. As a result, the images distorted due to the placement of camera 12, which are recorded in the further steps of the method, can be rectified based on the calibration image.

In a step S4, background image 22 of the space between sample carrier 2 and the lens is recorded. Background image 22 can be generated, for example, by a single recording of the space between the microscope lens and sample carrier 2 without interfering influences such as immersion fluid 6.

Background image 22 can also be generated by recording a plurality of images 20 with typical environmental variations, such as, for example, different illuminations. Background image 22 is then, as illustrated in FIG. 5, composed of a plurality of images 20 by processing means 16. The appearance of the microscope lens without immersion fluid 6 can also be estimated by processing means 16 from a background image 22 with immersion fluid 6 being in the space between the lens and sample carrier 2.

In a step S5, application means 8 is used to introduce immersion fluid 6 in the space between microscope lens and sample carrier 2, before in a step S6, the image with immersion fluid 6 being in the space between the microscope lens and sample carrier 2 is recorded.

Then, in a step S7, the position and contour 34 of immersion fluid 6 on sample carrier 2 are determined from the image recorded in step S6 and the image distortion determined in step S3. Contour 34 of the immersion fluid on the sample carrier is preferably determined by searching for a structure in the image which is located within a certain distance from a center of the microscope lens, cannot be assigned to the microscope lens and has an approximately annular shape.

In modifications, following step S7, contour 34 of immersion fluid 6 on sample carrier 2 is assessed and/or the volume of immersion fluid 6 is estimated and/or the remaining duration of immersion fluid 6 on sample carrier 2 due to evaporation is determined.

A plane E1 of the camera image, a plane E2 of sample carrier 2 and a plane E3 of the calibration pattern are preferably used for calibration and determination of the image distortion. As already explained, an image distortion based on a calibration process is determined from these three planes in steps S2 and S3. An overview of the determination of the image distortion is depicted in FIG. 3.

Figure 3:
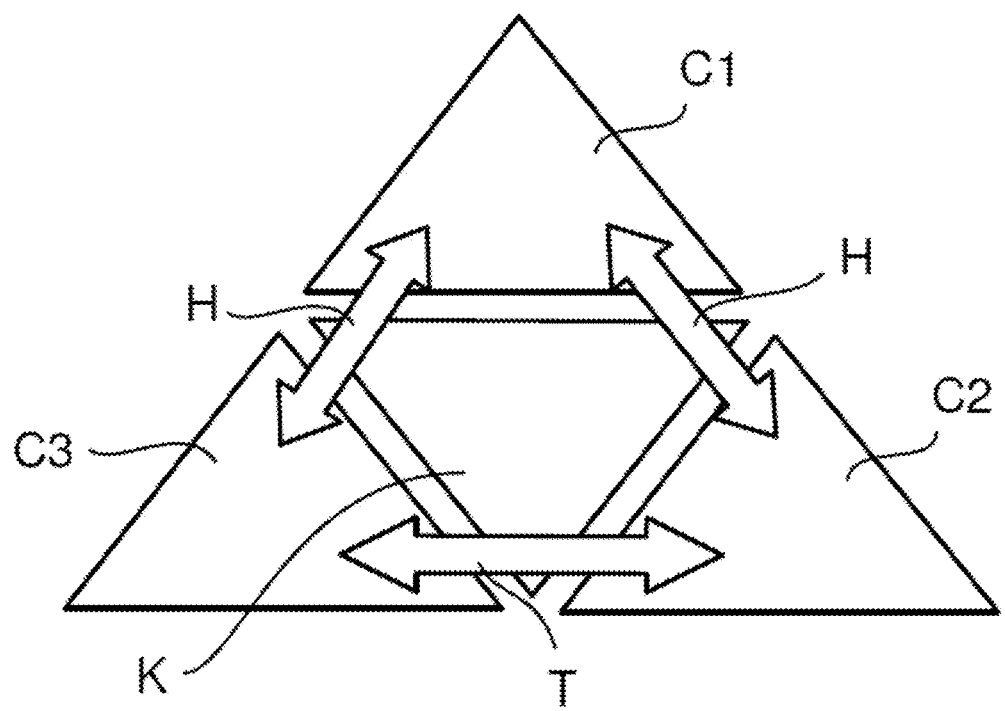
FIG. 3 shows a flow chart of a calibration process, FIGS. 4a and b show a safety distance as a function of a numerical aperture of a lens, FIGS. 5a and b show a contour of the immersion fluid on the lens.

FIG. 3 illustrates calibration process K in conjunction with the determination of the image distortion of processing means 16. Image coordinates C1 of plane E1 are linked with calibration coordinates C3 and sample carrier coordinates C2 via homography H. A transformation T takes place between sample carrier coordinates C2 and calibration coordinates C3.

Image coordinates C1 in plane E1 of the camera image represent sample carrier plane E2 as if camera 12 had recorded the image exactly from above. To calculate the distortion, sample carrier coordinates C2 and calibration coordinates C3 are first calculated in a transformation T and scaled. Coordinates C2 and C3 are then linked to image coordinates C1 via homography H. Homography H is used to map plane E1 onto plane E2. This makes it possible to rectify the images. Of course, the camera position and orientation can no longer be changed. In addition, with the aid of the calibration K, distortions that arise from the camera optics (e.g., barrel-shaped curvature) can be subtracted from the image.

In a modification, the point of intersection of the optical axis OA of the camera lens with sample carrier plane E2 in the image is localized in calibration K. In the event that camera 12 is oriented centrally from above or below towards sample carrier 2, this point of intersection is at the center point of the camera lens. The position of the camera lens in the image is normally known from the camera structure, but it can alternatively also be determined using a detection algorithm, possibly also manually.

Figure 4A:
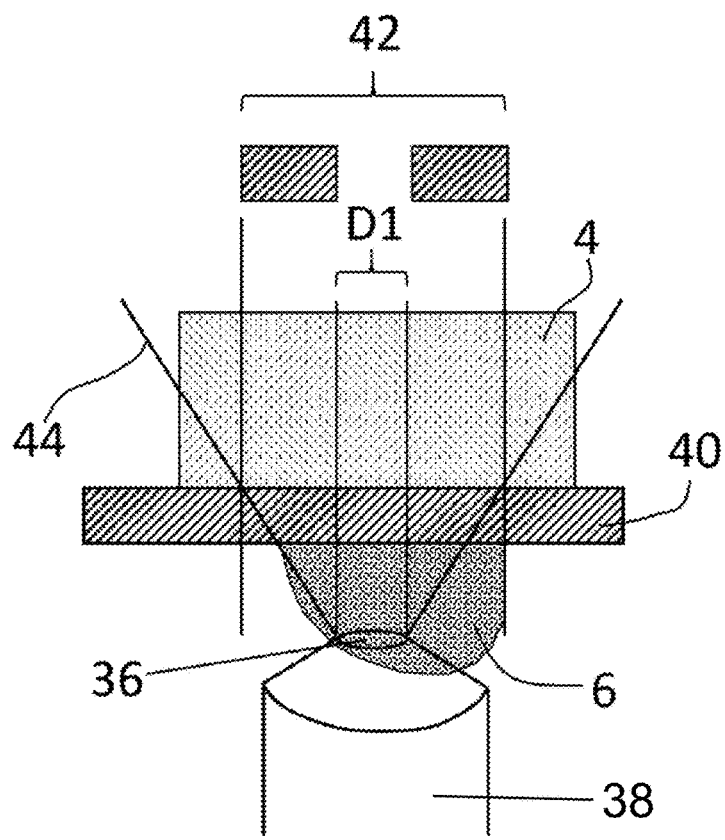

FIG. 4A shows a front lens 36 having a diameter D1. A cover slip 40 is also shown. Immersion fluid 6 is located in the form of drops between cover slip 40 and front lens 36.

Figure 4B:
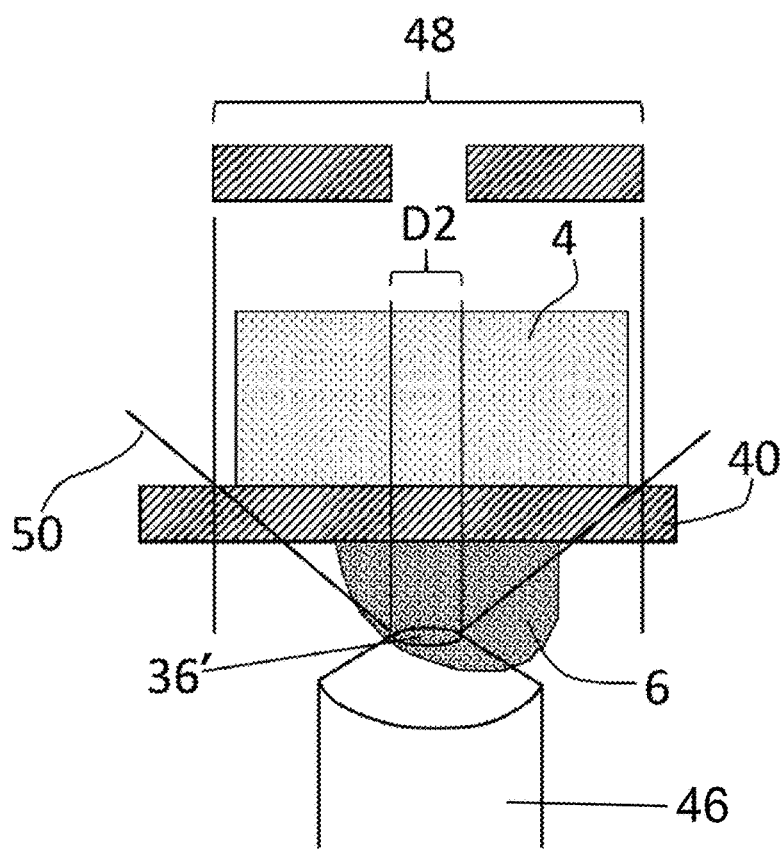

A safety area 42 and an opening angle 44 of microscope lens 38 are defined. FIG. 4B shows a front lens 36' of a microscope lens 46 with a comparatively higher aperture. Its diameter is D2. Immersion fluid 6 is located in the form of drops between cover slip 40 and front lens 36'. A safety area 48 and an opening angle 50 of microscope lens 46 are defined.

The quality of the drop of immersion fluid 6 can be assessed by the extent to which front lenses 36, 36' of microscope lenses 38, 46 is are covered with immersion fluid 6. Microscope lenses 38, 46 with different apertures differ in the size of front lenses 36, 36'. The size of front lenses 36, 36' can be taken from a lens database, for example. The numerical aperture describes the ability of microscope lenses 38, 46 to focus light. A higher aperture angle 44, 50 is therefore also associated with a higher aperture. For this reason, lens 38 has a smaller opening angle 44 than lens 46 with its opening angle 50.

For this reason, as depicted in FIGS. 4A and 4B, safety area areas 42, 48, which are dependent on the distance between sample carrier 2 and front lenses 36, 36', are defined around front lenses 36, 36' and which must be covered with immersion fluid 6 in order to ensure optimal image quality. This ensures that the front lenses 36, 36' and safety areas 42, 48 are always adequately covered with immersion fluid 6, and appropriate countermeasures, such as warning the user or the automated introduction of immersion fluid 6 via application means 8, can be initiated in good time. This ensures that the image quality remains constant over the entire duration of the experiment.

Figure 5A:
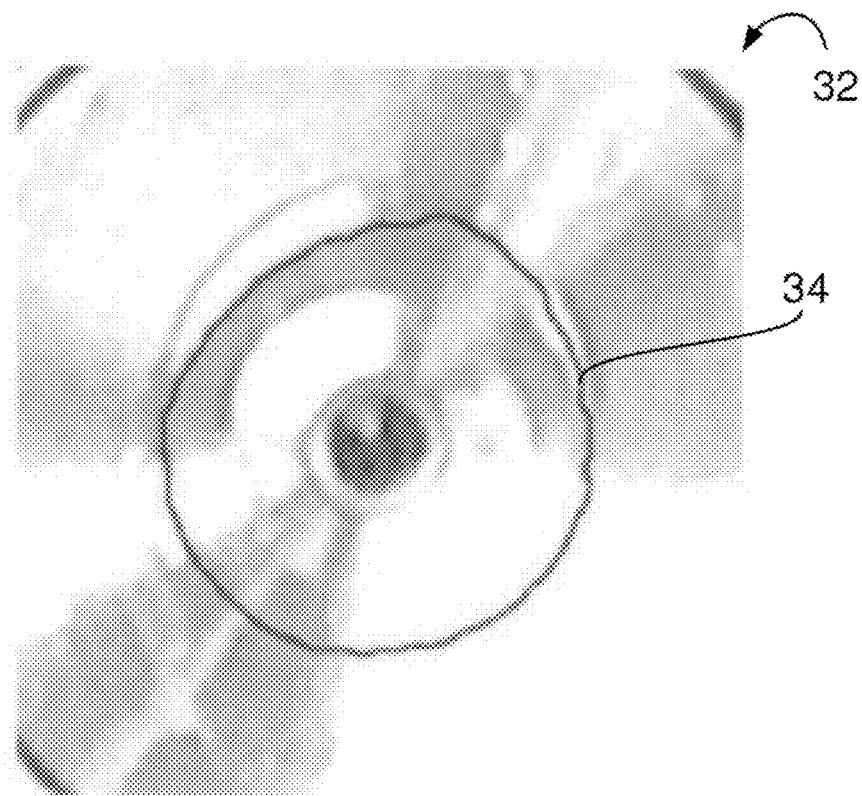
Figure 5B:
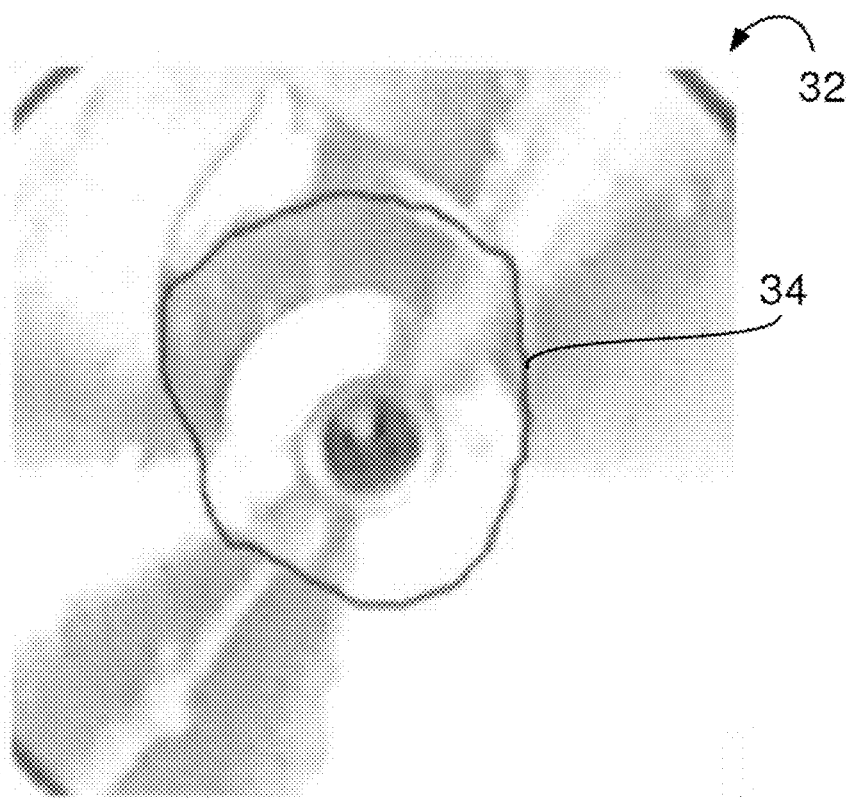

FIGS. 5A and 5B each show a resulting image 32 with a contour 34 of immersion fluid 6.

An ideal drop of immersion fluid 6 completely wets front lenses 36, 36' of microscope lenses 38, 46 and has a circular shape on sample carrier 2, which is shown in the image as a circular contour 34 (FIG. 7A). Due to external influences such as the movement of the sample table or if the volume of immersion fluid 6 is too small/large, it can happen that front lenses 36, 36' is are not completely covered and/or the shape deviates significantly from that of a circle (FIG. 7B).

The quality of the drop of immersion fluid 6 is determined in embodiments in regards to the extent that the drop resembles a circle by calculating suitable features, such as, e.g., the eccentricity of an ellipse, which optimally approximates contour 34, of the region defined by contour 34 in resulting image 32 and comparing them with manually defined data or training data. Contour 34 of immersion fluid 6 is classified from "sufficiently circular" to "too strongly deformed". In the event of excessive deformation, countermeasures, such as moving the table more slowly, haptic feedback, a warning to the user, etc., are carried out depending on the microscopy application.

In addition, a contact area of immersion fluid 6 on the sample carrier can easily be determined on the basis of the contour. In order to additionally be able to estimate the volume of the immersion fluid, calibration measurements are provided for each microscope lens 38, 46. With a known distance between microscope lens 38, 46 and sample carrier 2, several drops of immersion fluid 6 with different, known volumes are applied and their contact area with sample carrier 2 is then automatically determined from resulting image 32. This results in a 1:1 mapping between the volume of the immersion drop and its contact area for each microscope lens 38, 46. The volume of the drop of immersion fluid 6 is thus estimated from the contact area given a known distance between sample carrier 2 and microscope lens 38, 46. Optionally, it is also estimated how much volume still needs to be applied in order to achieve a desired target volume. Furthermore, by determining the volume of immersion fluid 6 and knowing the geometry of microscope lens 38, 46, it is possible to estimate whether the amount of immersion is sufficient for a predetermined recording in order to ensure a desired image quality at every position. Conversely, if the volume of immersion fluid 6 is known, it is also possible to determine the distance between sample carrier 2 and microscope lens 38, 46 from the contact area, which can be used, for example, as collision protection.

Figure 6:
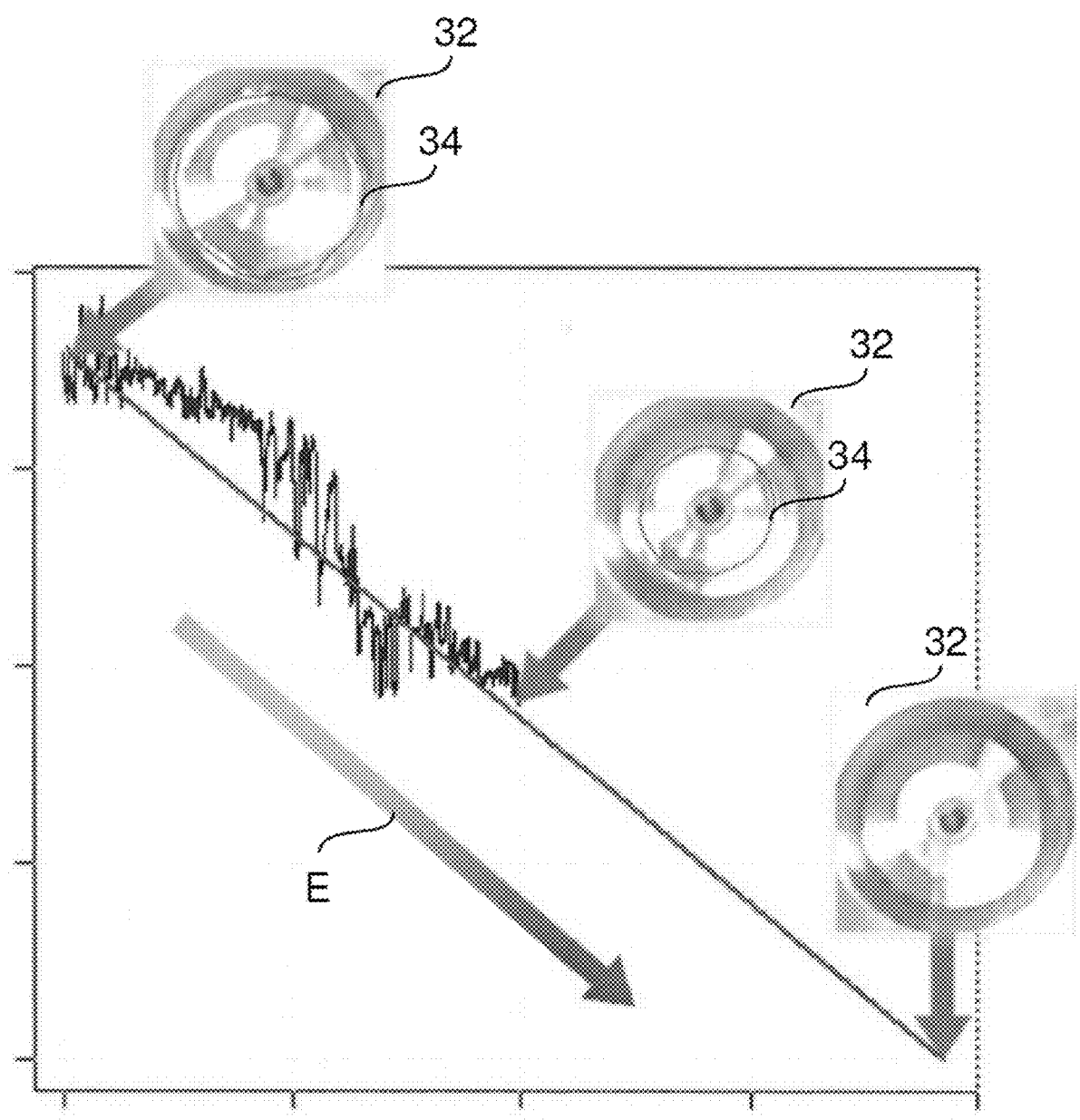
FIG. 6 shows an evaporation of the immersion fluid on a sample carrier over time.

In FIG. 6, the monitoring of a drop of immersion fluid 6, in this case water, is depicted in resulting image 32*a, b, c* over a certain period of time. Evaporation E is depicted. The expected area of the immersion fluid is depicted on the y-axis, and the time course is depicted on the x-axis.

As a result of the evaporation of immersion fluid 6 on sample carrier 2, the contact area of sample carrier 2 with the immersion fluid becomes continuously smaller. Regression can be used to predict how the drop will change over time. The development over time of the amount of immersion fluid 6 on sample carrier 2 is monitored and predicted by processing means 16 on the basis of the images from camera 12. This ensures a timely warning to the user in the event of a critical reduction in immersion fluid 6 on sample carrier 2.

LIST OF REFERENCE NUMERALS 1 microscope
2 sample carrier
4 sample
6 immersion fluid
8 application means
10 field of view
12 camera
14 electric lines
16 processing means
18 imaging device
20 typical image
22 background image
24 image
26 difference image
28 difference image in polar coordinates
30 path
32 resulting image
34 contour
36 front lens
38 low aperture lens
40 cover slip
42 security area
44 opening angle
46 high aperture lens
48 security area
50 opening angle
C1 image coordinates
C2 sample carrier coordinates
C3 calibration coordinates
D1 diameter of front lens
D2 diameter of front lens
E1 plane of the camera
E2 sample carrier plane
E3 calibration plane
H homography
K calibration
OA optical axis
S1 step 1
S2 step 2
S3 step 3

S4 step 4
S5 step 5
S6 step 6
S7 step 7
T transformation

The invention claimed is:

1. A method for monitoring an immersion fluid in a microscope having a lens which images a sample located on a sample carrier, comprising the steps of:
   a) positioning a camera which has an image field which is oriented in such a way that it captures the sample carrier and a space between the sample carrier and the lens adjoining the sample carrier towards the lens, the space being used to receive the immersion fluid,
   b) applying the immersion fluid into the space between the sample carrier and the lens,
   c) recording an image of the space between the sample carrier and the lens, with the immersion fluid being in the space,
   d) determining a position, area and/or contour of the immersion fluid on the sample carrier from the image recorded in step c),
   wherein, in step d), the position, area and/or the contour of the immersion fluid on the sample carrier is determined by searching for a structure in the image which is located within a certain distance from a center of the lens, cannot be assigned to the lens and/or has an at least partially annular shape.

2. The method according to claim 1, wherein the camera is calibrated after step a).

3. The method according to claim 2, wherein the calibration is carried out in that a calibration pattern is positioned in a plane of the sample carrier and in the image field of the camera, and a calibration image is recorded.

4. The method according to claim 1, wherein an image distortion caused by the position of the camera in the space between the sample carrier and the lens is determined and the determination of the position, area and/or contour of the immersion fluid on the sample carrier is carried out from the image recorded in step c) using said image distortion determined.

5. The method according to claim 1, wherein, after step a), a background image of the space between the sample carrier and the lens is recorded, and the determination of the position, area and/or contour of the immersion fluid on the sample carrier is carried out from the image recorded in step c) using said background image.

6. The method according to claim 1, wherein, in a step e), the contour and/or the area of the immersion fluid on the sample carrier is assessed and/or a volume of the immersion fluid is estimated and/or a remaining duration of the immersion fluid on the sample carrier due to evaporation is determined.

7. The method according to claim 6, wherein, in an event of excessive deformation, insufficient volume and/or insufficient remaining duration of the immersion fluid, a slower movement of the sample, a haptic feedback, a warning to a user and/or an automatic immersion is initiated.

8. The method according to claim 1, wherein a light source for illuminating the image field is used, which light source is attached to the camera.

9. The method according to claim 1, wherein a light source present on the microscope is used to illuminate the image field.

10. The method according to claim 8, wherein the image is recorded by the camera in an infrared spectral range.

11. The method according to claim 1, wherein the image is recorded using a polarization filter.

12. The method according to claim 8, wherein, in step c), several differently illuminated images are recorded, from an entirety of which the contour, the area and/or the position of the immersion fluid is analyzed.

13. The method according to claim 1, wherein, in step d), contaminants in the immersion fluid are detected.

14. The method according to claim 13, wherein the detected contaminants are filtered out of the image recorded in step c).

15. A device for monitoring an immersion fluid in a microscope having a lens which images a sample located on a sample carrier, wherein
   a camera having an image field is positioned such that the image field is oriented in such a way that it captures the sample carrier and a space between the sample carrier and the lens adjoining the sample carrier towards the lens, which space is used to receive the immersion fluid,
   processor which is connected to the camera via an electric line, and
   said processor is configured in such a way that it determines a position, area and/or contour of the immersion fluid on the sample carrier by using an image of the space between the sample carrier and the lens with immersion fluid in the space recorded by the camera,
   wherein the processor is configured in such a way that it determines the position, area and/or contour of the immersion fluid on the sample carrier by searching for a structure in the image which is located within a certain distance from a center of the lens, cannot be assigned to the lens and/or has an at least partially annular shape.

16. The device according to claim 15 having an applicator which is connected to the processor via an electric line and applies the immersion fluid into the space between the sample carrier and the lens.

17. The device according to claim 15, wherein the processor determines an image distortion caused by the position of the camera in the space between the sample carrier and the lens with the aid of a calibration image provided by the camera which calibration image shows the space between the sample carrier and the lens with a calibration pattern in a plane of the sample carrier and in the image field of the camera.

18. The device according to claim 15, wherein the processor uses a background image of the space between the sample carrier and the lens recorded by the camera for the determination of the position, area and/or contour of the immersion fluid on the sample carrier.

19. The device according to claim 15, wherein the processor is configured in such a way that it assesses the contour of the immersion fluid on the sample carrier and/or estimates a volume of the immersion fluid and/or determines a remaining duration of the immersion fluid on the sample carrier due to evaporation.

20. The device according to claim 19, wherein the processor is configured in such a way that, in an event of excessive deformation, insufficient volume and/or insufficient remaining duration of the immersion fluid, it initiates a slower movement of the sample, a haptic feedback, a warning to a user and/or an automatic immersion.

21. The device according to claim 15, wherein a light source for illuminating the image field is attached to the camera.

22. The device according to claim 15, wherein a light source present on the microscope illuminates the image field.

23. The device according to claim 15, wherein the camera records the image in an infrared spectral range.

24. The device according to claim 15, wherein a polarization filter is arranged on the camera in such a way that the camera records the image using said polarization filter.

25. The device according to claim 21, wherein the processor is configured in such a way that, in step c), several differently illuminated images are recorded, from an entirety of which the contour, the area and/or the position of the immersion fluid is analyzed.

26. The device according to claim 15, wherein the processor is configured in such a way that it detects contaminants in the immersion fluid.

27. The method according to claim 1, wherein the lens of the microscope has a first image field, the camera has a second image field, and the camera records the image of the space between the sample carrier and the lens.

* * * * *